Figure 5:
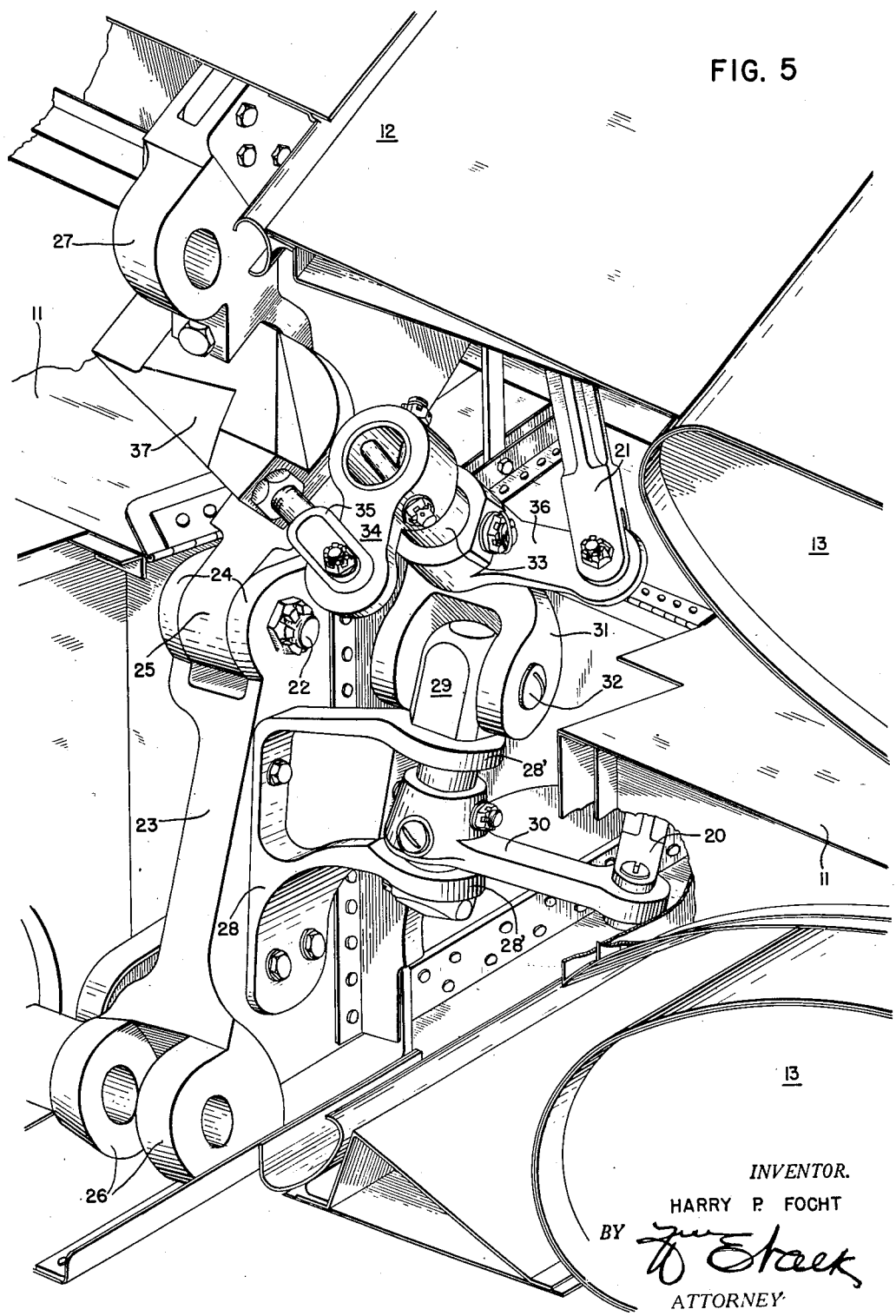

Dec. 19, 1950  H. P. FOCHT  2,534,764
FOLDING WING AILERON CONTROL UNIT
Filed Aug. 5, 1944  2 Sheets-Sheet 1
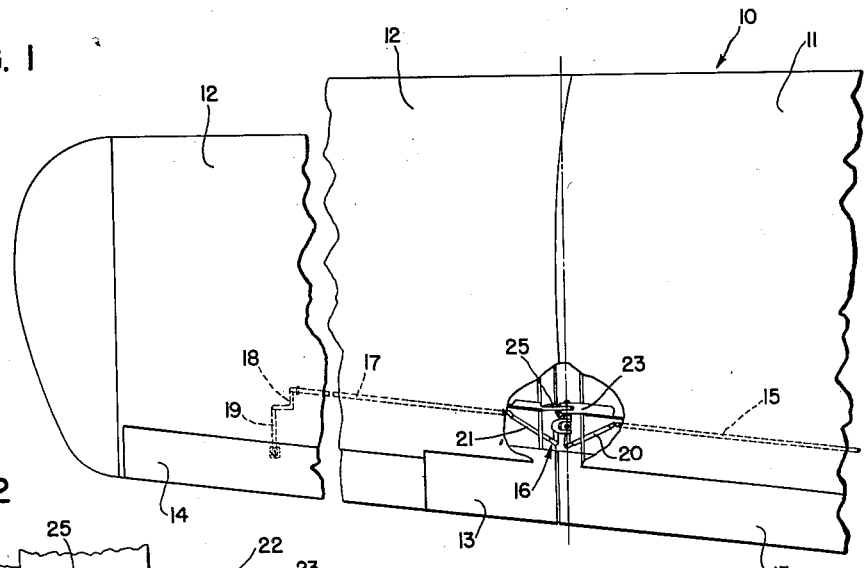
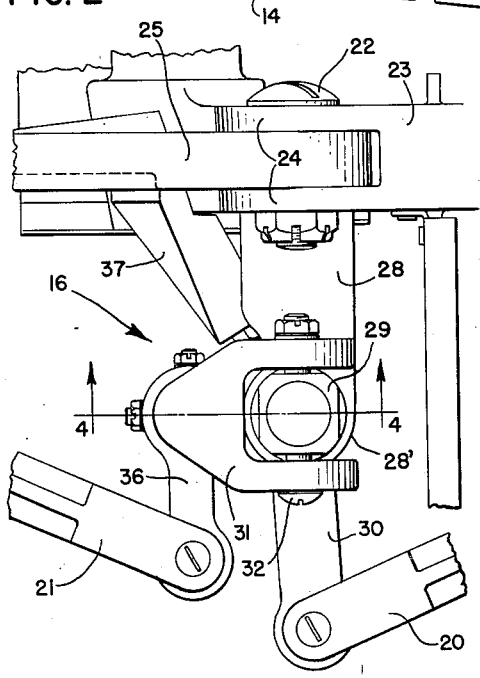
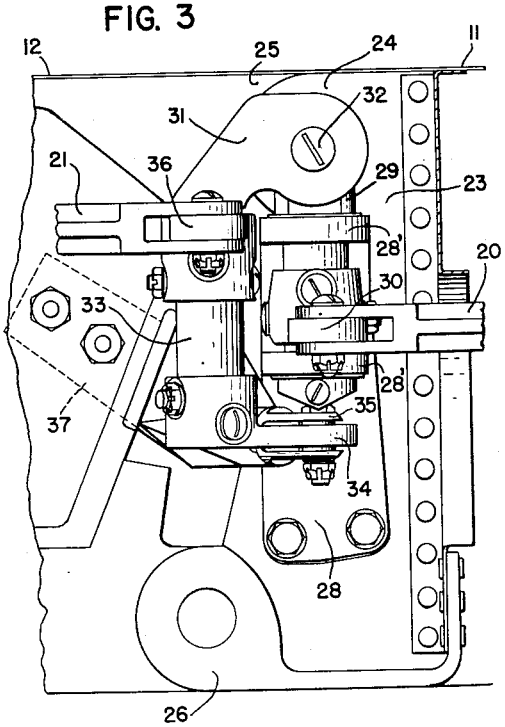
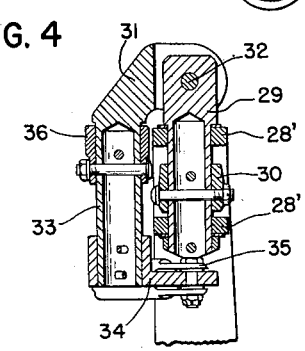
INVENTOR.
HARRY P. FOCHT
BY
ATTORNEY Dec. 19, 1950 H. P. FOCHT 2,534,764
FOLDING WING AILERON CONTROL UNIT
Filed Aug. 5, 1944 2 Sheets-Sheet 2

INVENTOR.
HARRY P. FOCHT
BY
ATTORNEY

Patented Dec. 19, 1950

2,534,764

UNITED STATES PATENT OFFICE 2,534,764

FOLDING WING AILERON CONTROL UNIT

Harry P. Focht, Kenmore, N. Y., assignor to Curtiss-Wright Corporation, a corporation of Delaware Application August 5, 1944, Serial No. 548,242

7 Claims. (Cl. 244—49)

This invention relates to aircraft and is particularly directed to an improved and foldable type of flight control surface actuating mechanism for aircraft having folding wings.

In folding wing aircraft it is necessary to provide some means for actuating the aileron surfaces and yet permit the folding of the wings without unduly complicating the structure required to realize that arrangement. The present arrangement for controlling an aileron or similar surface in a folding wing airplane is to proportion the control system so that slack in the system develops as the wing is folded. While this latter design is relatively easily arranged it is highly objectionable as the aileron surfaces are substantially unrestrained and freely responsive to air movements. Hence it is possible for sudden air current changes to buffet the control surfaces and do serious damage to the surfaces themselves or to the adjacent and supporting structure.

Accordingly it is an important object hereof to overcome the objections to the present aileron control systems for folding wing airplanes and prevent the conditions of surface buffetting and unrestrained movement.

It is also an object of the present invention to improve upon the prior aileron control systems for folding wing airplanes and to provide a simple control mechanism which shall be foldable upon folding of the wing.

A further object resides in the arrangement in a foldable type control linkage for aileron members of a system of cooperating lever means which combine, when the aircraft wing is folded, to lock the surface against further movement until the wing is unfolded and again in flight position.

Still another object may be found in the arrangement of the several parts of the control linkage so that the airplane control surfaces automatically may be moved into a neutral position upon the initiation of wing movement toward the folded position.

These and other objects will be more fully pointed out in the description of a preferred embodiment of the present invention as illustrated in the accompanying drawings, in which:

Figure 1 is a general plan view of an aircraft wing of the folding type to which the invention has been applied, a portion of the wing skin being broken away in the zone of the folding axis to reveal the foldable linkage, Figure 2 is a greatly enlarged plan view of the linkage mechanism indicated generally in Figure 1, Figure 3 is a greatly enlarged rear elevational view of the linkage mechanism, Figure 4 is a fragmentary sectional detail as seen at line 4—4 of Figure 2, and Figure 5 is an enlarged perspective detail of the preferred linkage mechanism with the wing structure moved into its folded position.

In Figure 1 the present invention is shown generally in connection with the wing 10 of a folding wing type aircraft. A center section 11 of the wing structure is provided with suitable supporting and pivot forming members, later to be described for a foldable outer wing section 12. Along the trailing edge of the wing structure is provided a high lifting device or flap surface 13 as well as a flight control surface or aileron 14, both being operably mounted on the foldable wing structure 12. Control of the aileron surface 14 is accomplished through a push-pull control system indicated by a pilot operated push-pull tube 15 connected through a foldable control unit 16 later to be described, to a second control tube 17, the latter in turn transmitting pilot applied forces to the aileron surface 14 by means of a bell crank 18 and connecting linkage 19. Suitable intermediate links 20 and 21 provide the direct connection from the rod 15 to and through the unit 16 to the aileron operating rod 17.

Referring now to Figures 2, 3 and 5 of the drawing, a more detailed description of the unit 16 will be given. In these views there is shown a main pivot element 22 which defines in part the folding axis between the wing structures 11 and 12. The pivot element is carried by the fixed bracket structure 23 in the upper set of pivot forming projections 24 to receive a mating pivot member 25 carried by the foldable component 12 of the wing structure. A lower pair of projections 26 on member 23 receives a lug 27 when the wing is extended and a locking pin or other device (not shown) is inserted in the aligned apertures of parts 26 and 27 thus securing the wing 12 in flight position. Attached to the rearward face of the bracket member 23 is a second and rearwardly extending bracket structure 28 suitably secured in position and providing pivot support projections 28' for an operating element 29 of the aileron control system. The element 29 is adapted to be rotated about an axis which is angularly inclined to the folding axis of the wing. Rotation of the element 29 is effected by a crank arm 30, the outer end of which is pivotally connected with the link 20 heretofore indicated. In cooperation with the first operating element 29 there is provided a second element 31 which shall hereinafter be referred to as a transfer member. The transfer member is pivotally supported on a suitable pivot element 32 carried at the upper end of the element 29. Other details of this transfer element (Figure 4) include a normally pendant shaft portion 33 which is arranged to lie substantially parallel to and in this case outboard of the operating element 29. The lower end of this pendant structure 33 carries an arm element 34 which is pivotally supported by a fixed fork 35. In addition to the arm 34 there is a second arm 36 extending in the general direction of the crank arm 30 hereinbefore described, thus providing a pivoted connection for the link 21 which is associated with push-pull tube 17.

Reference now will be had to Figures 3 and 5 in particular for a better understanding of the foldable operating unit 16 and the fixed fork 35 which provides the means for governing the folding function of the unit 16 when the wing structure 12 is moved from the extended position to the folded position. In Figure 3 it will be observed that with the wing structure 12 extended and assuming the aileron surface in a substantially neutral position the pivot axis of element 32 is in coincidence with the folding axis of the wing panel 12. At this time the fork 35 which is carried by a fixed bracket structure 37 on the foldable wing panel extends into the axis of rotation of the operating element 29 and the axis of the pivot connection between the crank 34 and the fork 35 is placed in coincidence with the axis of rotation of element 29. Thus the force applied along control rod 15 will serve to rotate the element 29 and hence displace the axis of pivot forming element 32 to either side of its normal position coincident with the folding axis of the wing proper. Control forces are transmitted to the aileron 14 by the bodily displacement of the transfer member 31 about the axis of rotation of element 29. In this manner fore and aft motion of the rod 17 and hence movement of the surface 14 is accomplished through the interconnecting link and crank elements 21 and 36 respectively.

Upon folding of the wing panel 12 about the axis extending through the pivot forming element 22 and a second and similar pivot means (not shown) located near the wing leading edge it will be observed that the first action is to move the transfer member 31 about the pivot 32. This will occur due to the connection of the fork 35 with the transfer member 31 by means of the crank arms 34. Because of the fact that the member 35 is a fixed part of the foldable wing panel 12 its motion upon folding will always be in a substantially vertical plane normal to the folding axis of the wing. Consequently the transfer member 31 must of necessity move in a plane normal to the folding axis of the wing. However, it might occur that the aileron surface 14 is not in a neutral position at the time of folding of the wing panel 12. In this condition the axis of pivot element 32 will be at an angle to and not in coincidence with the folding axis of the wing structure. Obviously with the pivot axis 32 thus displaced the transfer member 31 cannot move in its plane normal to the folding axis without binding or causing load build-up in the axis of pivot element 32.

It is the purpose of the member 35 to bring about or cause an alignment to occur between the wing folding axis and the pivot axis between the operating element 29 and the transfer element 31. An initial folding movement of the wing panel 12 will immediately cause the member 35 to come into play and move the transfer member 31 about the axis of rotation of the element 29 until the axis of pivot element 32 is exactly or substantially in coincidence with the folding axis of the wing. Thereafter wing panel 12 may be moved to its folded position and the linkage mechanism 16 will fold easily into the position shown in Figure 5.

While accomplishing a unique method of permitting a control system to be folded along with the folding component of an aircraft there is also provided an advantageous means for retaining the control surface such as the aileron 14 in a substantially fixed or locked position at or near its neutral position. As was pointed out previously the more usual aileron control system for a folding wing airplane generally involves the development of control system slack. Obviously in any control system which develops slack the control surface associated therewith becomes freely movable and is therefore subject to sudden or violent changes in air currents which might damage the surface or cause damage to the supporting structure. In the presently preferred arrangement the aileron surface 14 is immediately immobilized when the pendant portion 33 of transfer member 31 is moved out of parallelism with the operating member 29, the normal parallel relationship between these latter parts being indicated in Figure 4. From a study of Figure 5 it will be obvious that at the time transfer member 31 swings away from the operating element 29 the aileron link 21 will tend to cause rotation of the unit 16 about the axis of the member 29. However, this tendency toward rotation except for some inconsequential motion is prevented due to the fixity of position between control member 35 and crank 34, the latter being fixed to transfer member 31 in the manner indicated.

Other details of construction and operation are considered to be evident after a study of the foregoing, but it should be understood that certain details of construction may be modified or changed without departing from the features of the invention as defined by the claims hereafter appearing.

What is claimed is:

1. A mechanism for disposition in the aileron control system of a folding wing airplane having an aileron mounted on the foldable wing, said mechanism comprising an operating element normally movable about a principal axis which intersects the wing folding axis, a transfer member pivoted on said operating element for swinging displacement about an axis which may move into or out of a position of coincidence with the wing folding axis, the motion of the pivot axis between said element and member resulting in aileron movement, and a motion controlling part fixed to the foldable wing supporting said transfer member for rotation only whereupon folding of the wing the transfer member is forced to swing in a plane normal to the wing folding axis and hence rendering incapable the movement of the aileron.

2. A mechanism for disposition in the aileron control system of a folding wing airplane having an aileron mounted on the foldable wing, said mechanism comprising an operating element oscillatable about an axis intersecting the wing folding axis, a transfer member pivotally mounted on said operating element but normally oscillatable with the latter to effect displacement of the aileron to either side of its neutral position, the axis of the pivotal connection between said operating element and transfer member being disposed in substantial alignment with the wing folding axis when the aileron is in its neutral position, and a fork carried by the folding wing and operatively connected to said transfer member whereby upon folding movement of the wing the transfer member is caused to pivot about its axis and is thereby rendered incapable of oscillating movement with said operating element.

3. In a folding aircraft structure having a fixed portion and a portion foldable about a folding axis, a control surface carried on the foldable portion, an actuating system for moving said control surface to either side of a neutral position and comprising a rotatable unit having its axis of rotation intersecting said folding axis when the aircraft structure is extended, said unit having two parts a different one of which is mounted for rotation on each of said portions, and said parts being hinged for folding about an axis that is coincident with said folding axis in the position of said rotatable unit wherein the control surface is substantially in said neutral position.

4. In a folding aircraft structure, two sections having a hinged connection and each section having a control element mounted thereon for rotation relative thereto, the axes of rotation of said elements intersecting the axis of said hinge connection at a common point, said axes of rotation being coincident in one relative position of said sections and being angularly related in other relative positions of said sections, and a hinge connection between said elements having its axis in coincidence with the axis of the hinge connection of said sections in one position of rotation of said elements.

5. In a folding aircraft structure, two sections having a hinge connection for relative movement between folded and extended positions, each section having bearing means supporting a control element for relative angular movement about an axis intersecting the said section hinge connection axis, said axes of angular movement being coincident when the sections are in extended position and being angularly related when said sections are folded, the bearing means of both sections being disposed to the same side of said section hinge connection axis when said sections are in extended relation, and a hinge connection between said elements having its axis in coincidence with said section hinge connection axis.

6. In a folding aircraft structure, two sections having a hinge connection and each section having an element of a control system mounted thereon for rotation, the axes of rotation of said elements being coincident in one relative position of said sections and being angularly related in other relative positions of said sections, and a hinge connection between said elements having its axis lying in a plane perpendicular to the axis of rotation of said elements when the axes of said elements are coincident, the axis of said last mentioned hinge connection being in coincidence with the axis of the hinge connection of said sections in one position of rotation of said elements.

7. In an aircraft wing structure of folding type having a folding axis, a control surface carried on the foldable wing portion, a control surface actuating system including an element rotatably mounted in the foldable wing portion and an element rotatably mounted in the fixed wing portion, said elements having their axes of rotation coincident when the wing is unfolded and angularly related when the wing is folded, a hinge connection between said elements having its axis coincident with the folding axis in one position of rotation of said elements, and said folding axis lying substantially within a plane of revolution about the axes of said elements.

HARRY P. FOCHT.

REFERENCES CITED

The following references are of record in the file of this patent:

UNITED STATES PATENTS

| Number | Name | Date |
|---|---|---|
| 1,708,373 | Weymouth | Apr. 9, 1929 |
| 1,759,442 | Depew | May 20, 1930 |
| 2,044,357 | Kerr | June 16, 1936 |
| 2,166,564 | Atwood et al. | July 18, 1939 |

FOREIGN PATENTS

| Number | Country | Date |
|---|---|---|
| 524,864 | Great Britain | Aug. 16, 1940 |